US006561458B1

(12) United States Patent
Lowery

(10) Patent No.: US 6,561,458 B1
(45) Date of Patent: May 13, 2003

(54) APPARATUS AND METHOD TO MEASURE AND IMPLEMENT AIRCRAFT SEAT SPACING

(75) Inventor: Gordon G. Lowery, Hominy, OK (US)

(73) Assignee: American Airlines, Inc., Dallas/Ft. Worth Airport, TX (US)

( * ) Notice: Subject to any disclaimer, the term of this patent is extended or adjusted under 35 U.S.C. 154(b) by 21 days.

(21) Appl. No.: 09/872,525

(22) Filed: Jun. 1, 2001

(51) Int. Cl.[7] ............................................. B64D 11/06
(52) U.S. Cl. .................. 244/118.6; 297/463.2; 297/217.7
(58) Field of Search ................. 244/118.6; 297/463.2, 297/217.7

(56) References Cited

U.S. PATENT DOCUMENTS 4,936,527 A * 6/1990 Gorges ..................... 104/165
5,236,153 A * 8/1993 LaConte .................. 244/118.6
6,227,595 B1 * 5/2001 Hamelin et al. .......... 296/65.01
6,293,322 B1 * 9/2001 Wilson-South ............. 144/137

* cited by examiner

Primary Examiner—J. Woodrow Eldred
(74) Attorney, Agent, or Firm—Head, Johnson and Kachigian

(57) ABSTRACT

An apparatus and method to measure and implement desired spacing between successively positioned aircraft seating accommodations. A first base unit positioning template is abutted to a seating accommodation foot structure to provide for accurate measurement positioning and a second base unit positioning template is adjustably positioned to indicate said desired spacing. Said apparatus is easily transitioned to provide for subsequent seat spacing measurement.

19 Claims, 4 Drawing Sheets

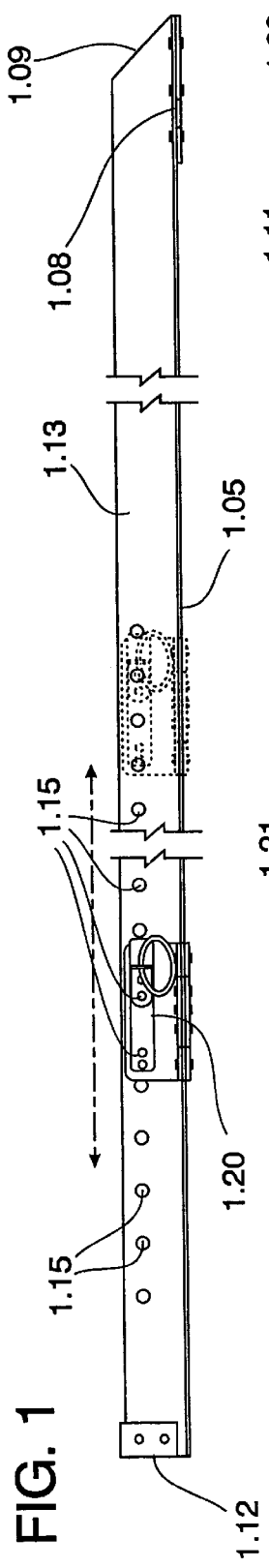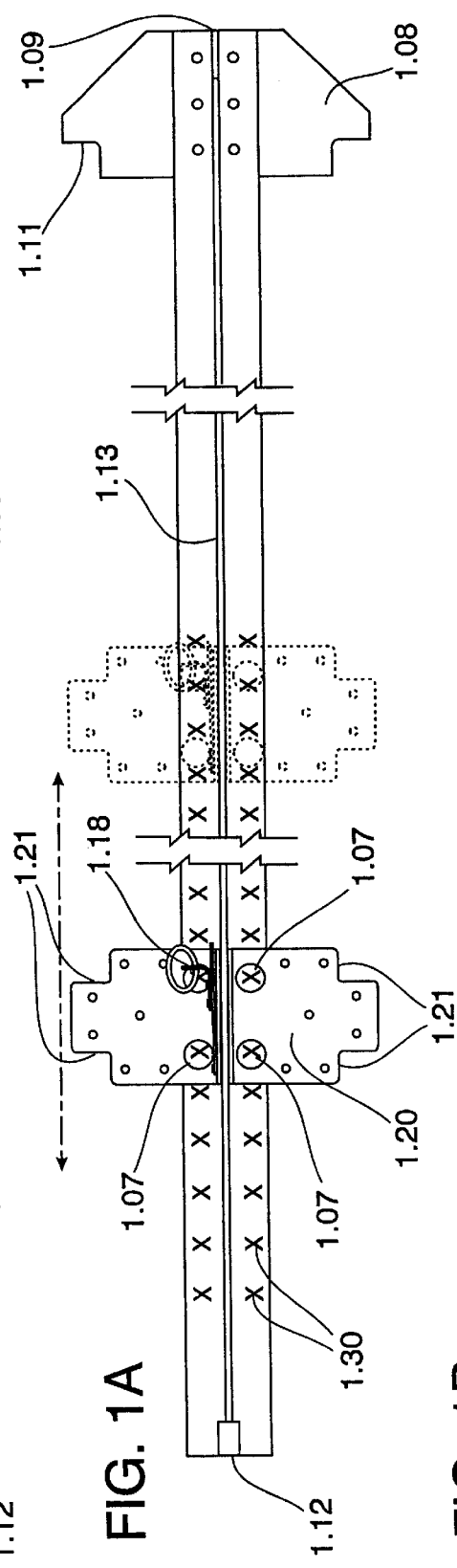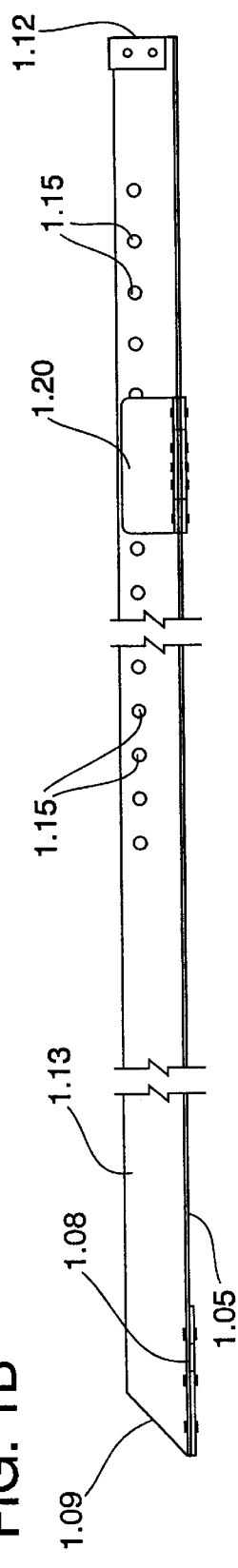

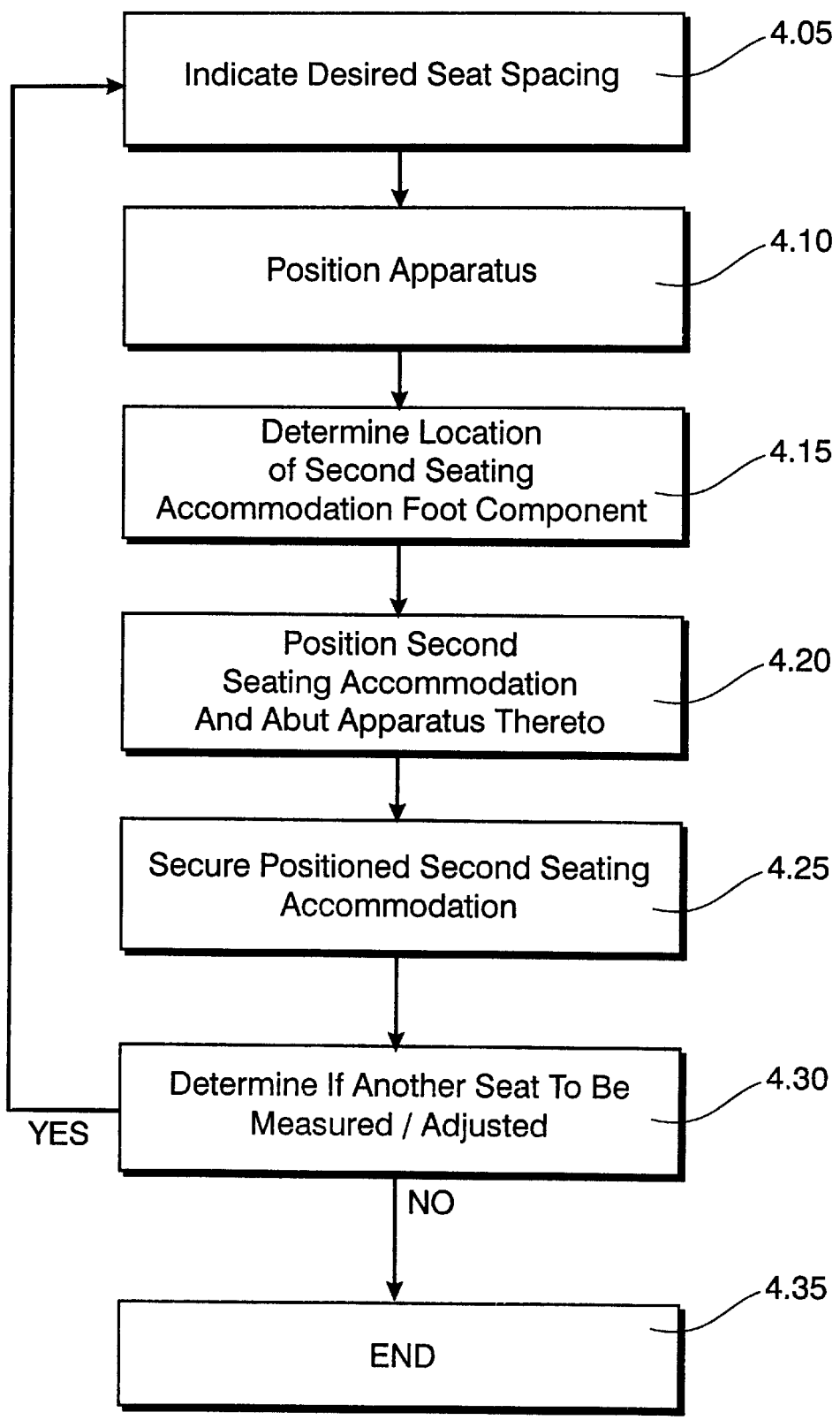

APPARATUS AND METHOD TO MEASURE AND IMPLEMENT AIRCRAFT SEAT SPACING

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

In general, the present invention is directed to aircraft seat positioning. In particular, the present invention is directed to an apparatus and method to measure, establish and implement a desired spacing between successively positioned aircraft seating accommodations.

BACKGROUND OF THE INVENTION

Commercial aircraft seating accommodations (a.k.a. aircraft seats) must be spaced, or 'distanced' appropriately to provide for the ongoing comfort and safety of passengers. Specifically, mandates of the Federal Aviation Authority ("FAA") require that spacing between successively positioned aircraft seats fall within established measures to provide for in flight, and emergency evacuation, passenger safety. Routine maintenance and FAA inspections require that aircraft seat spacing be verified as to their 'spacing' accuracy. Indeed, as aircrafts age, maintenance practices during "heavy C checks" call for the removal of all aircraft seating accommodations and inspection of seating and attachment structures prior to reinstallation of removed seats. Such operations require that the aircraft seats first be installed and spacing between successively positioned seats be measured by a pair of mechanics and then verified by two or more oversight agency personnel. In the recent past, the Applicant has undertaken a number of successful marketing initiatives whereby aircraft seating configurations have been modified to provide increased leg room between seating accommodation rows.

The instant invention advances the art by providing a method and apparatus which reduces the time necessary to measure and implement aircraft seat spacing. Practicing the teachings of the instant invention's method and apparatus and, given extensive testing, it is estimated that net savings between 1 and 2 minutes per seat spacing measurement adjustment can be realized via practice of the instant invention. Utilizing the instant invention, a time savings for a 150 seat aircraft would fall between 2½ to 5 hours, a 300 seat aircraft would fall between 5 to 10 hours, and a 400 plus aircraft would fall between 7–14 hours. Such time savings represent substantial cost savings to an airline.

Consequently by using the instant invention, an aircraft could be returned to service between 2½ to 14 hours sooner than would be realized under present art measurement practices, resulting in significant cost savings throughout airline industry.

BRIEF SUMMARY OF THE INVENTION

The present invention provides for an improved method and apparatus for greatly improving upon present art practices relied upon to measure, establish and implement a desired spacing between successively positioned aircraft seating accommodations. A first base unit positioning template is abutted to a seating accommodation foot structure to provide for accurate measurement positioning and a second base positioning template is adjustably positioned to denote a desired spacing between said first and second seating accommodations. Said apparatus is easily transitioned to provide for subsequent seating accommodation measurements.

Consequently, it is an object of the instant invention to reduce the amount of time necessary to measure, establish and implement a desired spacing between successively positioned aircraft seating accommodations.

Another object of the instant invention is to verify and maintain seat spacing requirements throughout an aircraft, irrespective of seat location.

A further object of the instant invention is to reduce labor requirements associated with measuring, establishing and implementing desired aircraft seat spacing.

Yet another object of the instant invention is to reduce oversight agency labor requirements associated with verifying desired aircraft seat spacing.

An additional object of the instant invention is to repeatedly provide for an accurate measure of desired seat spacing.

A further object of the instant invention is to accommodate, measure establish and implement desired aircraft seat spacing, irrespective of aircraft type or seat manufacturer.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIGS. 1, 1A and 1B illustrate side and top views of the invention's apparatus as practiced in its preferred embodiment.

FIG. 4 illustrates method sequence steps by which the invention's practice may be realized.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 2:
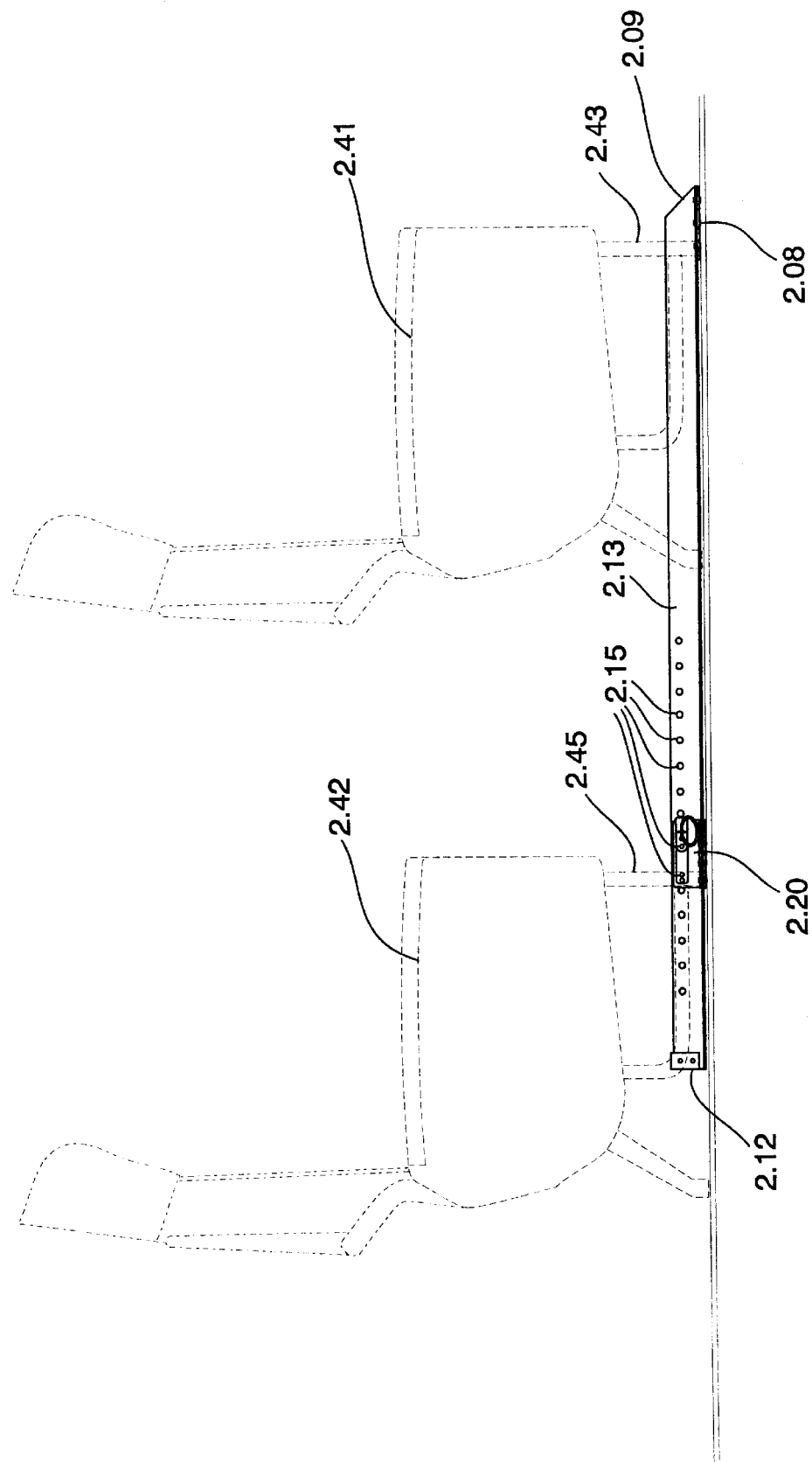
FIG. 2 is an illustration providing further detail with respect to first and second base unit positioning template accommodations when abutting first and second aircraft seating components.

FIGS. 1, 1A and 1B illustrate side and top views of the invention's apparatus as practiced in its preferred embodiment. As can be seen in FIGS. 1, 1A and 1B the invention's base component 1.05 has attached at a first end 1.09 a first unit positioning template 1.08. Also attached to the base component 1.05, in an adjustable/slidable manner is a second base unit positioning template 1.20. The second base template 1.20 is affixed to said base component 1.05 via a track structure 1.13 which allows said second base unit positioning template 1.15 to be variably positioned between the invention's first base positioning unit template 1.08 and a second end 1.12 of the base component 1.05. To position and fix the second base unit positioning template 1.20 along said indicated range of travel, the track structure of base restriction unit 1.13 and second positioning template 1.20 each contain at least one aperture 1.15 through which a positioning pin, bolt or other similarly intended structure may be inserted. Also illustrated in FIG. 1 are positioning indicators 1.30 which may be viewed through apertures 1.07 in said second positioning template 1.20 to indicate a desired spacing between seating accommodations. Said first base unit positioning template 1.08 is shown permanently affixed in a non-adjustable/non-slidable manner to a first end 1.09 of the invention's base component 1.05 via rivets, bolts, Hilok and other similarly intended structures 1.10 to permanently position said first positioning template 1.09. A patterned accommodation (a.k.a. "cut-out") 1.11 further defines the template structure and allows for abutting of said template along a first aircraft seating accommodation foot component (not shown). In a similar manner, a patterned accommodation 1.21 of a second base unit positioning template 1.20 allows for the abutting of said second template 1.20 against a second aircraft seating accommodation foot component 1.45. Upon positioning said first and second templates 1.08, 1.20 against said foot components and having further inserted a pin positioning device 1.15 through said apertures 1.15, the invention is securely positioned for seat spacing purposes. FIG. 2 provides greater detail with respect to the invention's first and second base unit positioning templates 1.08, 1.20 which securely abut first and second aircraft seating accommodation foot components as practiced in the invention's preferred embodiment. Turning now to FIG. 2.

Figure 3:
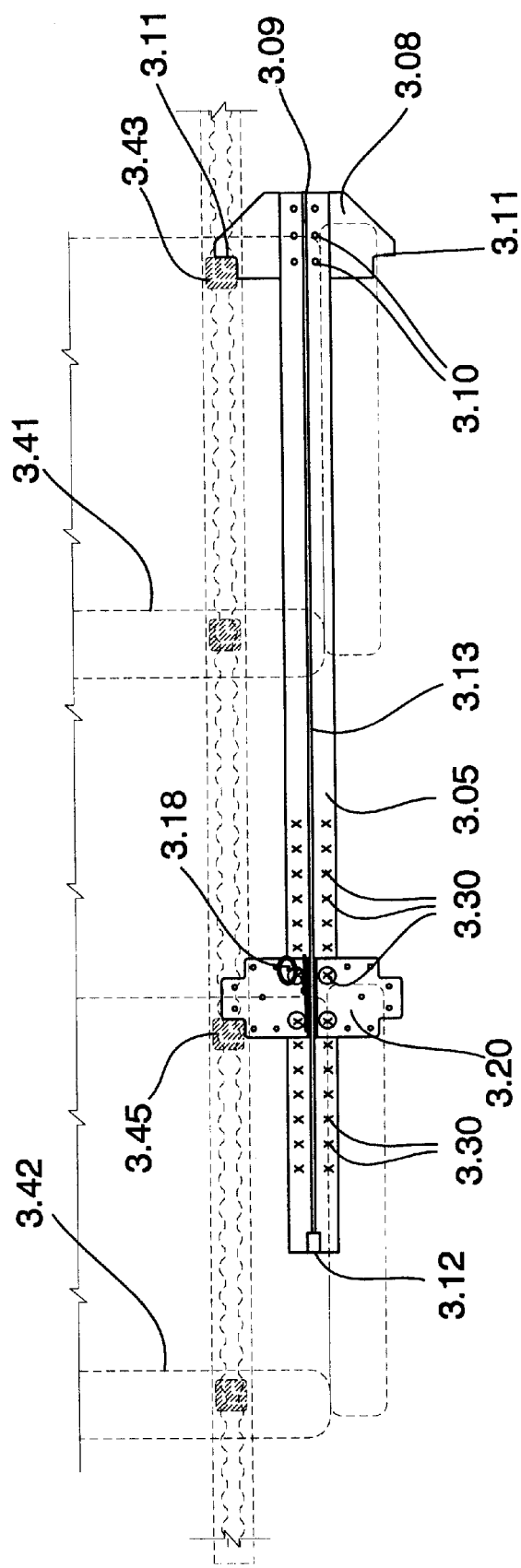
FIG. 3 is a top view illustration of the positioning of the base unit positioning templates and first and second seating accommodation foot components.

In FIG. 2 two successively positioned aircraft seating accommodations are noted as 2.41 and 2.42 respectively. The successively positioned aircraft search accommodations are typically, though not limitedly, manifested as successfully positioned rows of aircraft seating accommodations. For purposes of illustration and enabling disclosure it should be assumed that seats as indicated in positions 2.41 and 2.42 are representative of multiple seats occurring in parallel alignment. Also shown in FIG. 2 is a side view of the invention's track structure 2.13 embodying multiple apertures 2.15 to facilitate the securing of a variably positioned second positioning template 2.20. Said securing effectuated via the insertion of pin, Hilok, bolt or other similarly intended structure inserted through an apertures in said second positioning template 2.20 and said track 2.15. Generally shown is the positioning of the instant invention between said first and second seating accommodations 2.41, 2.42. The positioning of the instant invention made facilitated by abutting a first base unit positioning template 2.08 securely against a first aircraft seating accommodation foot component 2.43. Said abutting accommodated via a pattern accommodation in the first base component positioning template as discussed and illustrated in FIGS. 1 and 3 (not shown in FIG. 2). FIG. 2 also generally illustrates the placement of a second seating accommodation 2.42 having once positioned the variably located second base unit positioning template 2.20 to a desired spacing as indicated via positioning indicators located on the invention's base component 2.05 and viewed through apertures in said second positioning template 2.20. FIG. 3 further illustrates the positioning of said base unit location components 2.08, 2.20 and first and second seating accommodation foot components 2.43, 2.45. Turning now to FIG. 3.

In FIG. 3 two successively positioned aircraft seating accommodations are denoted as 3.41, 3.42. A first base unit positioning template 3.08 is shown permanently affixed in a non-adjustable/non-slidable manner to a first end 3.09 of the invention's base component 3.05 via rivets, bolts, Hilok and other similarly intended structures 3.10 to permanently position said first positioning template 3.09. A patterned accommodation (a.k.a. "cut-out") 3.11 further defines the template structure and allows for abutting of said template along a first aircraft seating accommodation foot component 3.43. In a similar manner, a patterned accommodation 3.21 of a second base unit positioning template 3.20 allows for the abutting of said second template 3.20 against a second aircraft seating accommodation foot component 3.45. Upon positioning said first and second templates 3.08, 3.20 against said foot components 3.43, 3.48 and having further inserted a pin positioning device 3.18 through apertures in the second positioning template and the track structure 3.13 of the invention's base component 3.05, the invention is securely positioned for seat spacing purposes.

FIG. 4 illustrates a non-limiting sequence by which the invention's practice may be effectuated. The invention is first practiced by first indicating a desired seat spacing upon the apparatus of the instant invention 4.05. This indication is accomplished by slidably adjusting the invention's second base unit positioning template along the invention's track until a desired spacing is revealed through one of the apertures in said second base positioning template indicating the positioning of a successively placed seating accommodation. As an example, the number 32 may typically appear when 32 inch spacing is desired between two successively placed aircraft seats; or 28 may appear when 28 inch spacing is desired between two successively placed aircraft seats. The invention is next positioned by abutting the first base unit positioning template of the apparatus securely against a first aircraft seating accommodation foot component 4.10. Once so abutted, the apparatus's position is verified to be positioned to fall parallel to a seat track placement structure located within commercial aircraft. The invention second positioning template is then viewed to determine the placement of a second seating accommodation foot component which would provide for said desired indicated spacing 4.15. Once so located a second seating accommodation is placed within the aircraft seating track structure abutted to a pattern accommodation embodied within the second positioning template 4.20. Once so abutted, the second seating accommodation may be secured to the appropriately spaced second seating accommodation 4.25. A subsequently spacing measurement may be had by easily removing the apparatus and repeating the afore noted sequence 4.30.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. An aircraft seat spacing measurement and positioning apparatus comprising:
    an apparatus base component; and
    at least one base unit positioning template attached to said apparatus base component;
    wherein the apparatus is not attached to aircraft seats being spaced.

2. The apparatus of claim 1 wherein said apparatus base unit positioning template further comprises at least one accommodation patterned to securely abut a first aircraft seating accommodation foot component.

3. The apparatus of claim 1 wherein said apparatus base component further comprises a plurality of base unit positioning templates.

4. The apparatus of claim 1 wherein said apparatus base component further comprises at lease one aperture through which a positioning pin may be inserted to position a base unit positioning template.

5. The apparatus of claim 1 wherein said base unit positioning template is attached to a first end of said apparatus base component.

6. The apparatus of claim 1 wherein said base component further comprises a second base unit positioning template, said second positioning template adjustably attached to said apparatus base component and variably located between said first base unit positioning template and a second end of said apparatus base component.

7. The apparatus of claims 1 or 6 wherein said apparatus base component further comprises a plurality of apertures through which a positioning pin may be inserted to fix the position of said second positioning template and a track component along which said second positioning template may be variably positioned.

8. The apparatus of claim 6 wherein said second positioning template further comprises at least one aperture through which a positioning indicator may be observed.

9. The apparatus of claim 6 wherein said second positioning unit further comprises at least one accommodation patterned to securely abut a second aircraft seating accommodation foot component.

10. An aircraft seat spacing measurement and positioning apparatus comprising:
    an apparatus base component;
    a first base unit positioning template attached to a first end of said base component; and
    a second base unit positioning template adjustably attached to said apparatus base component and variably located between said first base unit positioning template and a second end of said base component;
    wherein the apparatus is not attached to aircraft seats being spaced.

11. The apparatus of claim 10 wherein said first positioning template further comprises an accommodation patterned to securely abut a first aircraft seating accommodation foot component.

12. The apparatus of claim 10 wherein said second positioning template further comprises an accommodation patterned to securely abut a second aircraft seating accommodation foot component.

13. The apparatus of claim 10 wherein said apparatus base component further comprises a plurality of measurement positioning indicators.

14. The apparatus of claim 10 wherein said second positioning template further comprises at least one aperture through which a positioning indicator may be observed.

15. A method to determine and implement precisely measured aircraft seat spacing comprising:
    determining a desired seat spacing between first and second aircraft seating accommodations;
    aligning an aircraft seat spacing measurement and positioning apparatus generally between said first and second aircraft seating accommodation, wherein the apparatus is not attached to aircraft seats being spaced;
    indicating said desired seat spacing upon said positioned apparatus; and
    adjusting seat spacing between said first and second seating accommodations to be in accord with that indicated upon said apparatus.

16. The method of claim 15 wherein said aligning further comprises abutting an aircraft seat spacing measurement and positioning apparatus first base unit positioning template securely against a first aircraft seating accommodation foot component.

17. The method of claim 15 wherein said aligning further comprises abutting an aircraft seat spacing measurement and positioning apparatus second base unit positioning template securely against an aircraft second seating accommodation foot component.

18. The method of claim 15 wherein said determining of a desired seat spacing between said first and second aircraft seating accommodations further comprises locating an aircraft seat spacing measurement and positioning apparatus measurement bar to indicate a desired seat spacing between said first and second seating accommodations.

19. A method to determine and implement precisely measured aircraft seat spacing comprising:
    determining a desired seat spacing between first and second aircraft seating accommodations;
    aligning an aircraft seat spacing measurement and positioning apparatus with said first and second aircraft seating accommodation, wherein the apparatus is not attached to aircraft seats being spaced;
    indicating said desired seat spacing upon said positioned apparatus;
    adjusting seat spacing between said first and second seating accommodations to be in accord with that indicated upon said apparatus;
    abutting an aircraft seat spacing measurement and positioning apparatus first base unit positioning template securely against a first aircraft seating accommodation foot component;
    abutting an aircraft seat spacing measurement and positioning apparatus second base unit positioning template securely against an aircraft second seating accommodation foot component; and
    determining of a desired seat spacing between said first and second aircraft seating accommodations further comprises locating an aircraft seat spacing measurement and positioning apparatus measurement bar to indicate a desired seat spacing between said first and second seating accommodations.

* * * * *